Jan. 12, 1960 Y. BREÉLLE 2,920,610
ROTARY INTERNAL COMBUSTION ENGINE
Filed Oct. 8, 1957 8 Sheets-Sheet 2
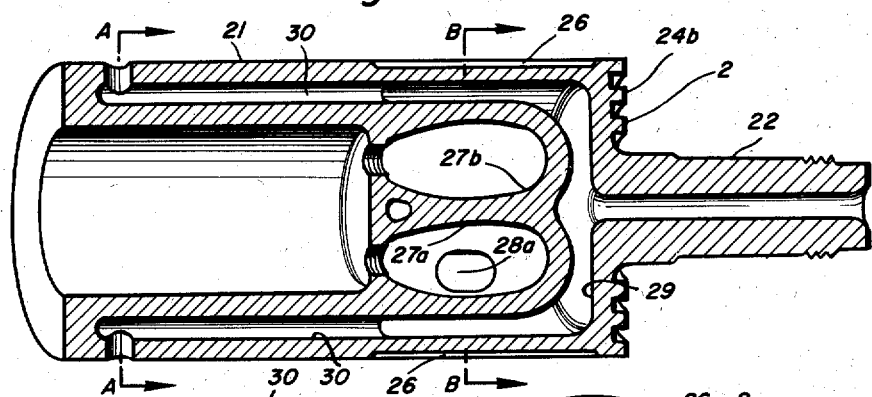
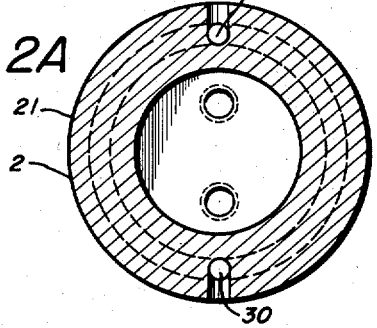
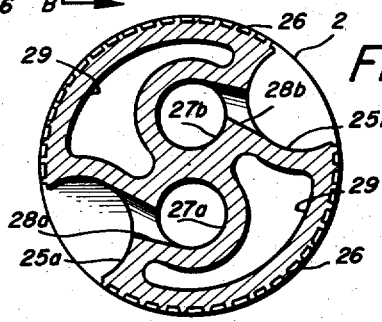
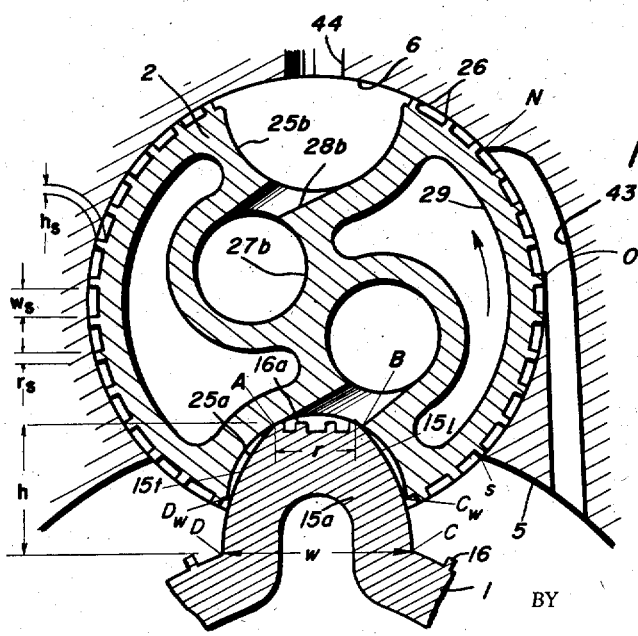
INVENTOR
YVES BREELLE
BY
ATTORNEYS Jan. 12, 1960 — Y. BREÉLLE — 2,920,610
ROTARY INTERNAL COMBUSTION ENGINE
Filed Oct. 8, 1957 — 8 Sheets-Sheet 3

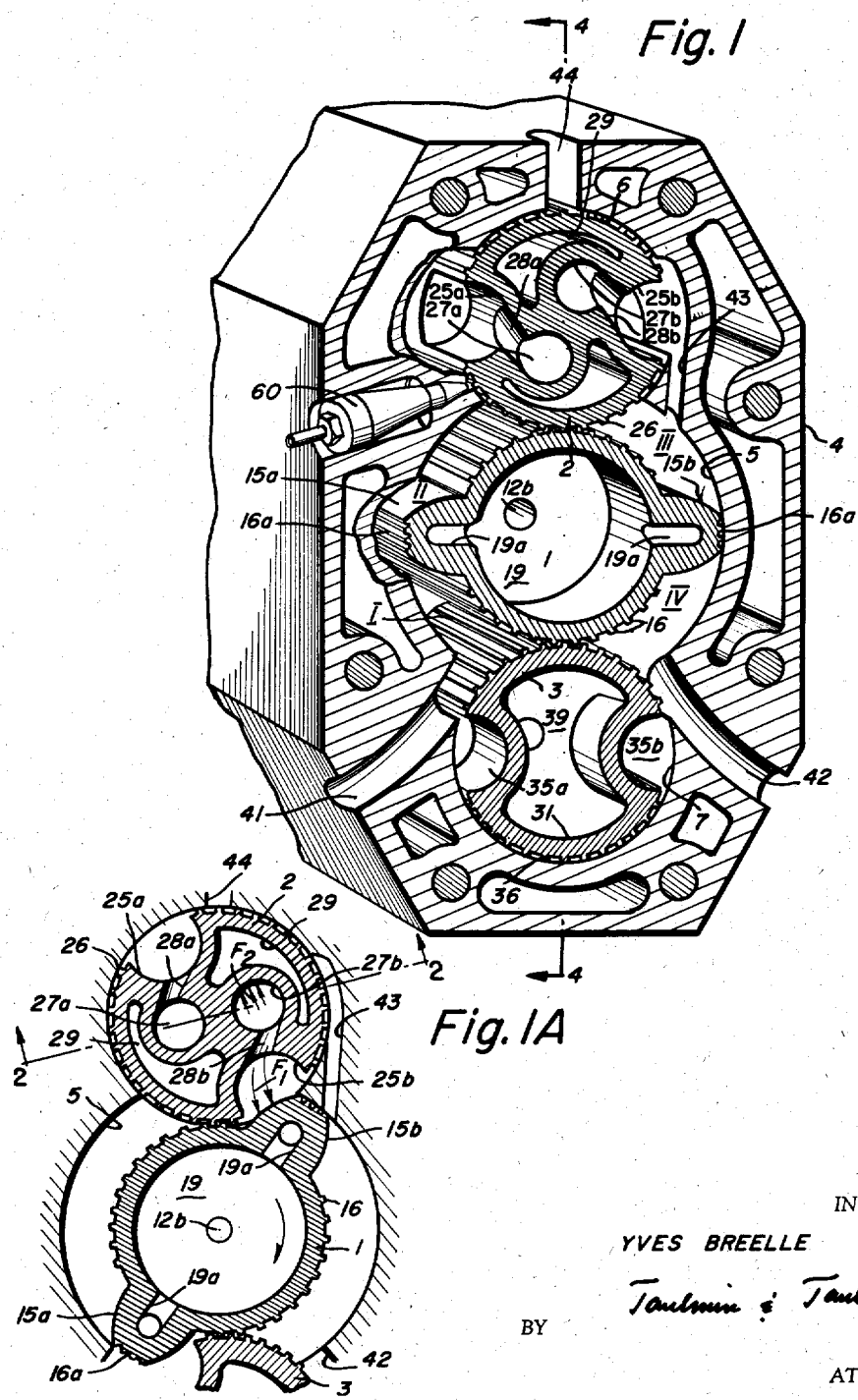

INVENTOR.
YVES BREELLE
BY Taulmin & Taulmin
Attorneys

Jan. 12, 1960     Y. BREÉLLE     2,920,610
ROTARY INTERNAL COMBUSTION ENGINE
Filed Oct. 8, 1957     8 Sheets-Sheet 4

INVENTOR.
YVES BREELLE
BY
Attorneys

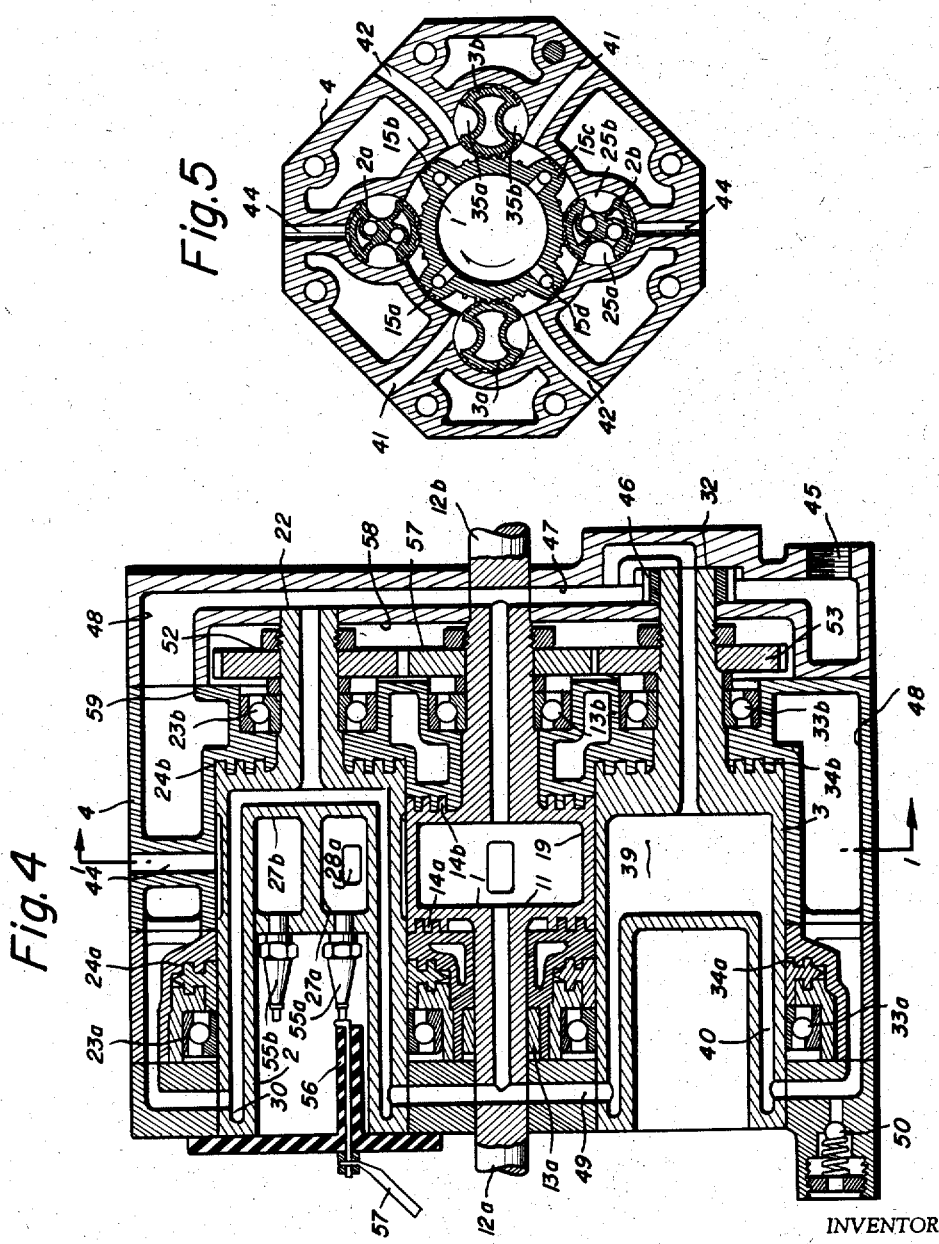

Jan. 12, 1960  Y. BREÉLLE  2,920,610
ROTARY INTERNAL COMBUSTION ENGINE
Filed Oct. 8, 1957  8 Sheets-Sheet 6
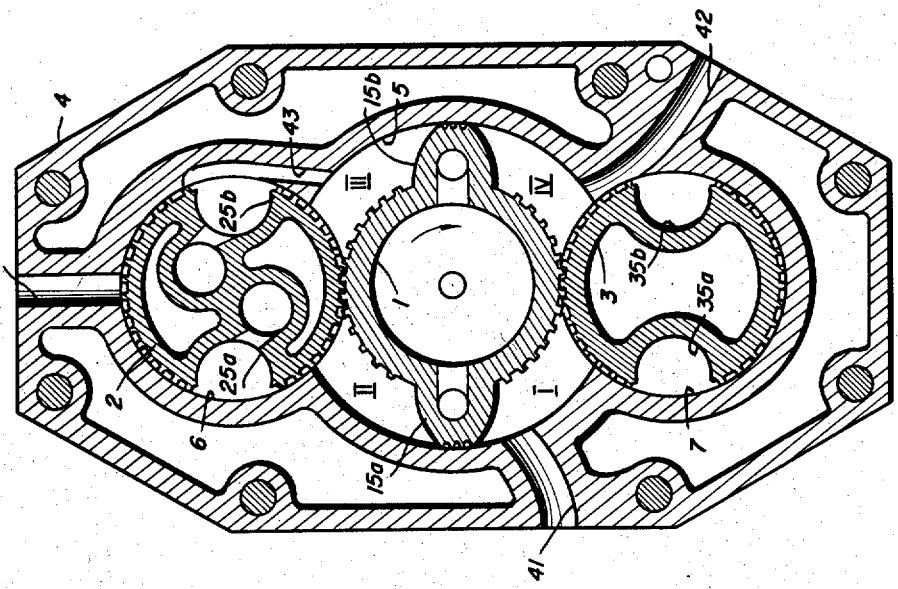
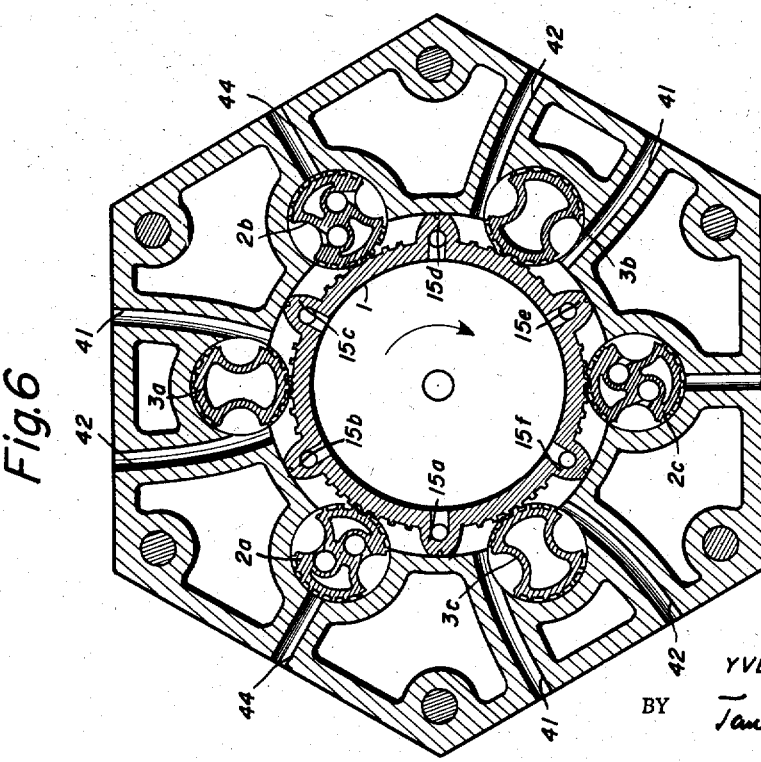
INVENTOR.
YVES BREELLE
BY
Attorneys an United States Patent Office 2,920,610
Patented Jan. 12, 1960

2,920,610

ROTARY INTERNAL COMBUSTION ENGINE

Yves Breélle, Rueil-Malmaison, France, assignor to Institut Francais du Petrole, des Carburants et Lubrifiants, Paris, France Application October 8, 1957, Serial No. 688,908

Claims priority, application France October 8, 1956

26 Claims. (Cl. 123—13)

This invention relates to multi-cycle rotary internal combustion engines of the rotating abutment type.

This application is a continuation-in-part of my pending application, Serial No. 574,833 filed March 29, 1956, now abandoned.

Various types of rotary engines have been heretofore proposed, such as those described in the Patents 2,070,631 to Sunderland, 2,466,759 to Baylin, 2,722,201 to Muse, the French Patents Nos. 1,009,435 and 990,652, and French patent of addition No. 55,958. However, it has been found in practice that rotary engines of known type are subject to series disadvantages, among which are unbalance of rotating parts, slipping between cooperating rotors which are in frictional engagement with one another and consequently local heating, inefficient and uneconomical operation, and lack of adequate cooling to permit continuous operation at full load.

Thus, due to the heat generated by friction between the rotary elements and the stator and between the rotary elements themselves, in particular at high speed, for instance of several thousand revolutions per minute, the rotors and stator will be heated unevenly, whereby different parts thereof expand differently, and distortions and binding between rotary parts and the stator become inevitable and make the use of such rotary engines impracticable. Attempts have been made to overcome these drawbacks at least partly by using expensive alloys of high heat resistance; such attempts have, however, been too uneconomical to permit the extensive use of rotary engines in the past.

It is an object of my invention to provide a greatly improved rotary internal combustion engine having the following advantages:

(1) All rotating parts are symmetrical about their respective axis of rotation so as to provide static and dynamic balance and permit operation at high speed without vibration.

(2) Cooperating rotors are interconnected by positive drive means outside the power generating section of the engine so as to maintain perfect synchronization at all times, while the rotors themselves and the stator do not enter into bodily, i.e., direct mechanical contact.

(3) The construction in accordance with the invention and in particular the use of combustion rotors of novel form, in connection with a novel sealing system for rotary engines, makes it possible to attain high speed, high compression, high power and high efficiency.

(4) Effective cooling is provided not only for the block or casing of the engine but also for the rotors, with particular attention given to those parts subject to greatest heat so that the engine can operate continuously at full load. Moreover, the cooling of the rotors does not, in any way, impair their static and dynamic balance.

It is another object of my invention to provide a new method of effectively sealing and cooling the rotor and stator elements in a rotary engine, which is then free from uneven or excessive heating of these parts, thus permitting the use of conventional materials for the construction of these engines and at the same time their operation at much higher speeds and with a better output of power than the known engines.

It is a further object of the invention to provide a rotary engine of the type described in which lubrication of the power generating section of the engine can be dispensed with.

These objects are achieved and the drawbacks of the known rotary engines avoided by my present invention, which provides a multi-cycle rotary internal combustion engine comprising an engine stator or casing and, in a number of cavities or chambers therein, a central, preferably cylindrical rotor mounted on the power shaft of the engine and having a plurality of longitudinally extending piston lobes spaced uniformly about the circumference of the aforesaid central rotors and housed in a central bore of the engine stator for rotation therein. The rotary engine according to the invention further comprises a plurality of at least two gate or sealing rotors, also sometimes termed rotary abutments in the art, which are disposed about the said central rotor for cooperation therewith and which are rotatable about axes parallel to the axis of the central rotor. Each of these gate rotors has a plurality of recesses or wells for the passage of the pistons of the central rotor therethrough. These wells extend longitudinally in the direction of the gate rotor axis and open at the circumferential, preferably cylindrical surface of the respective gate rotor, and are so distributed in the rotor that the weight of the latter remains well balanced during the rotation of the rotor about its axis.

These gate rotors are housed in cavities or bores, preferably of cylindrical shape with their central axes parallel with each other and with the central axis of the aforesaid central stator chamber, which cavities intersect the central chamber, thus forming one uninterrupted internal stator chamber enclosing all the rotors therein.

At least one of the gate rotors is a combustion rotor housing a combustion space, and described in more detail hereinafter.

The rotary engine further comprises a gear train for synchronizing the movement of the several peripheral rotors with that of the central rotor and the power shaft to which the latter rotor is generally keyed. This gear train is housed in a chamber of the engine casing separate from the above-mentioned stator chamber enclosing the rotors.

It is an important feature of rotary engines according to my invention that they possess one or several combustion rotors which house the combustion space proper inside that rotor and which rotors cooperate with the central power rotor bearing the piston lobes in the central engine chamber.

Due to the fact that at least two combustion chambers are provided in the combustion rotor communicating with a corresponding number of wells therein, which combustion chambers and wells are evenly distributed about the central axis of the combustion rotor, a perfect equilibration of the latter is achieved. This equilibrium is maintained further by an equally even distribution of cooling spaces in the rotor in such a manner that all external and internal wall portions of the rotor are of preferably uniform thickness, guaranteeing uniform cooling thereof and preventing distortions of the rotor due to uneven heat expansion during operation which may lead to binding in the stator cavity housing the rotor.

According to another important feature thereof, at least two combustion chambers are housed in the interior of one of the gate rotors peripherally disposed about a piston-lobe-bearing central power rotor, which chambers are in communication with the wells in the rotor through passageways which open tangentially to the preferably approximately circular cross-section of the combustion chambers into the latter. Consequently, and also due to the fact that the combustion chambers may be of cylindrical, but preferably of ovoid or almost spherical shape, a high degree of turbulence is achieved in the combustion chamber, thus guaranteeing a more satisfactory combustion of the entire explosive mixture and improved output rates of the engine.

As another advantageous feature, subsequent to the combustion of the explosive mixture in the combustion chamber, the flame advancing through the passageway into the well heats the walls of the former whereby a certain amount of pre-heating of the next-following fresh gaseous charge is effected prior to the combustion of the same.

Furthermore, the passageways connecting the combustion chambers in the interior of the combustion rotor with the wells in the outer surface of the rotor also open tangentially into these wells, which fact brings about other important advantages in the rotary engine according to the invention.

The expansion of the burnt gases in a direction tangential to the well directs the full impact thereof in a favorable direction against the pistons to be driven, while the reactive forces, tangentially directed toward the rear walls of the combustion chamber, add a further increment to the propulsion of the combustion rotor in the direction of its rotation.

The gear train mentioned hereinbefore, outside the stator cavities housing the various rotors of the engine, then transmits the aforesaid reactive forces from the shaft of the combustion rotor to the power shaft bearing the central rotor and thus enhances the output rate of the engine.

The effect of the forces of expansion of the burnt gases is prolonged by providing in the engine stator channel means for maintaining communication between the combustion chamber, passageway and well of the combustion rotor on the one hand, and the power zone in the central chamber of the engine on the other hand. Exhaust conduit means provided in the stator and connecting the wall of the cavity housing the combustion rotor at a point remote from the opening of the aforesaid channel means in said combustion rotor, to the outside atmosphere, permits escape of the burnt gases to the outside. This has the advantage that only a very small portion of the burnt gases is returned to the next following cycle, and to reduce pressure in the well after each expansion to near atmospheric pressure.

According to a further important feature of my invention, labyrinth-type sealing means are provided between the rotors, cooperating with one another, between gate rotors and the inner walls of their enclosing cavities, and between the ridges of the pistons and the inner wall of the central chamber.

Thereby, friction due to mechanical sliding of the parts on each other is avoided, and the detrimental local heating effects leading to wear and distortion of rotary parts in all known engines, are completely eliminated.

The labyrinth-type sealing means comprise ribs and grooves therebetween on the mantle surfaces of the rotors, and the turbulences created in the grooved recesses intermediate adjacent ribs are so high that they effectively prevent any substantial losses of gas from the side of higher to that of lower pressure past the labyrinth sealing. Such losses as occur are negligible compared with the magnitudes of charges and pressures involved in the engine and the resultant power output of the same, and are far outweighed by the advantages of the resultant "cooler" operation of the entire rotary system.

By choosing the volume of the combustion chamber in the rotor, which is easily exchangeable, it is possible to utilize a wide range of compression rates.

In the embodiments of the invention to be described hereinafter, there are a plurality of complete cycles per revolution of the central rotor, each cycle including four steps, namely, intake, compression, expansion and exhaust, these embodiments thus corresponding to "four strokes" engines. The number of complete cycles per revolution of the central rotor corresponds to the product of the number of pistons with the number of the combustion rotors. Engines having a number of pistons different from the number of combustion rotors or a multiple thereof are desirable in that they provide more uniform torque. Multi-cycle engines, in accordance with the invention, have a central rotor provided with an even or uneven number of circumferentially spaced lobes preferably disposed at regular intervals and a number of peripheral rotors higher than 2. The peripheral rotors comprise alternately combustion rotors and sealing rotors.

According to one group of embodiments of the rotary engines according to my invention, a multi-cycle engine is built to comprise a central rotor having $p$ pistons distributed circumferentially about the central rotor at angles of $$\frac{360°}{p}$$

relative to each other, the angles being taken at the central rotor axis; $r$ sealing rotors located spacedly at angles of $$\frac{360°}{r}$$

from each other about the central rotor, the angles being taken at the central axis of the latter rotor; and $r$ combustion rotors spaced at $$\frac{360°}{r}$$

from each other, about the central rotor, the angles being taken at the central rotor axis. When the number $p$ of pistons is equal to the number $r$ of combustion rotors or a multiple thereof, the engine carries out $p$ times $r$ simultaneous cycles per revolution of the central rotor.

The central rotor in a rotary engine according to my invention may have an uneven number of pistons, and the number of gate rotors peripherally disposed about the central rotor does not depend necessarily upon the number of pistons of the central rotor.

Thus, the combustion and sealing rotors may be arranged about the periphery of the central rotor in such a manner that a single sealing rotor is always arranged intermediate two combustion rotors; for example if $r$ is the number of combustion rotors cooperating with the central rotor, the number of pistons of the central rotor may be advantageously selected as $2r+1$ distributed at angles of $$\frac{(360°)}{2r+1}$$

taken at the central rotor axis about the central rotor.

It is often advisable to use more than one combustion rotor associated with the central rotor, and the use of a number of pistons, different from the number of combustion rotors (or a multiple thereof) for the central rotor then assures a more regular and smoother transmission of power.

The same effect of a smoother transmission of power in multicycle rotary engines can, however, also be achieved by using a central rotor bearing a number of pistons equal to the number of combustion rotors or a multiple thereof, jointly with a plurality of gate rotors which are not evenly distributed peripherally about the central rotor, but when the various planes containing their shafts and passing through the power shaft of the central rotors form different angles with each other.

The profiles of the pistons of the central rotor and those of the wells of the gate rotors through which these pistons pass, are devised in a manner to be described in detail hereinafter, whereby a small amount of play is permissible between gears of the synchronizing gear train of the engine.

The cooling system in the rotary engines according to my invention plays an important part in the good functioning of the same. The central rotor as well as the combustion rotor are preferably cooled by circulating a liquid coolant through internal hollow spaces in these rotors, which communicate with coolant conduits in the stator fed from a coolant pump.

The sealing rotors may also be cooled by passing therethrough a gaseous coolant under slightly elevated pressure over the pressure prevailing in the exhaust side of the central stator chamber.

As an additional advantageous feature of the invention, the interspaces between the end faces of the rotors transverse to their central axes, on the one hand, and the corresponding wall of the stator cavities in which the rotors are housed, on the other hand, are connected through appropriate conduits with the outside of the engine, thereby permitting the escape of any gas portions eventually escaping past the labyrinth-type annular sealing means provided on these walls, to the surrounding atmosphere. Thereby, these gases are prevented from reaching the rotary bearings of the rotor shafts, which they might damage by forming thereon solid soot and the like deposits.

The objects, characteristics and advantages of the invention will appear more fully from the following description and claims in conjunction with the accompanying drawings which illustrate preferred embodiments of the invention by way of example.

In the drawings:

Figure 1 is a cross section of a rotary internal combustion engine in accordance with the invention taken approximately on the line 1—1 in Figure 4.

Figure 1A schematically illustrates the same rotary engine as in Figure 1, with the rotors in a different position.

Figure 2 is an axial section of the combustion rotor according to the invention taken approximately on the line 2—2 in Figure 1A.

Figures 2A and 2B are cross sections taken respectively on the lines A—A and B—B in Figure 2.

Figure 3 is an enlarged fragmentary section corresponding to a portion of Figure 1 showing a combustion rotor and adjacent portion of the central rotor in a different position.

Figure 4 is an axial section on a smaller scale taken approximately on the line 4—4 in Figure 1 but with the rotors in a slightly different position.

Figure 5 is a cross section similar to Figure 1 but showing a further embodiment of the invention.

Figure 6 is a cross section similar to Figure 1 but showing still another embodiment.

Figures 7 and 8 are cross sections similar to Figure 1 and illustrating modifications.

Figure 4A:
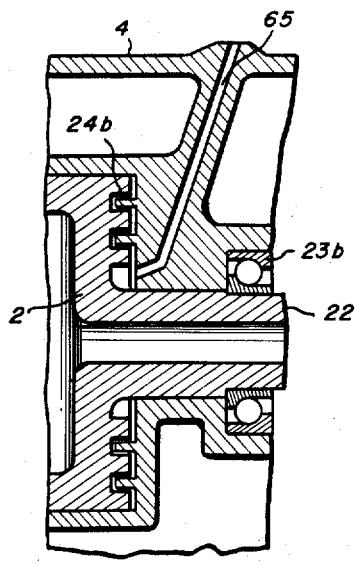
Figure 4A shows an enlarged fragmentary sectional view corresponding to a portion of Figure 4 showing the region of a rotor shaft supported in rotary bearings and conduit means for communication of this region with the outside.

While the construction shown in Figure 4 corresponds in general to that of Figure 1, certain details are varied or omitted for the sake of clarity by reason of the smaller scale of Figure 4.

The embodiment of the invention shown by way of example in Figures 1 to 4 comprises a central rotor 1, and a plurality of peripheral rotors arranged around the central rotor and shown as comprising a combustion rotor 2 and a sealing rotor 3. The rotors are housed in a casing or block 4 provided with intersecting cylindrical bores or chambers 5, 6 and 7 in which the rotors 1, 2 and 3 are respectively mounted.

The central rotor 1 comprises a central hollow cylindrical portion 11 and aligned hollow shafts 12a, 12b projecting axially from opposite ends of the cylindrical portion 11. The rotor is rotatably supported by bearings 13a and 13b. Annular labyrinth-type seals 14a and 14b are provided on the end faces of the cylindrical portion 11 and adjacent portions of the housing. On the periphery of the cylindrical portion 11, there are provided radially projecting pistons or lobes 15a, 15b which extend axially over a substantial portion of the length of the cylindrical portion 11 and are spaced uniformly in a circumferential direction, two such lobes being shown in Figure 1. The lobes 15a and 15b preferably project a distance equal to approximately half the radius of the central rotor and, as described more fully below, have a cross sectional shape similar to that of a spur gear tooth. On the periphery of the cylindrical portion 11 between the lobes 15a and 15b, there are provided small longitudinally extending ribs and grooves 16 providing for a labyrinth-type sealing. Similar ribs and grooves 16a or 16a' are provided on the ridges of the lobes 15a and 15b. The interior of the hollow cylindrical portion 11 of the central rotor 1 provides a cooling chamber 19 which communicates with the hollow shafts 12a and 12b and has portions 19a extending out into the lobes 15a and 15b which are thus hollow.

The combustion rotor 2 comprises a cylindrical portion 21 (Figure 2) and an axially projecting hollow shaft 22. It is rotatably supported in the housing by bearings 23a and 23b. Annular labyrinth-type seals 24a and 24b are provided on the combustion rotor 2 and adjacent portions of the housing. In the periphery of the cylindrical portion 21, there are provided longitudinally extending circumferentially spaced recesses or wells 25a and 25b to receive the lobes 15a and 15b of the central rotor 1 as the rotors turn in synchronism with one another. Longitudinally extending ribs and grooves 26 provided on the periphery of the rotor 2 mesh with the corresponding ribs and grooves 16 on rotor 1, free from mechanical contact and friction, to provide a substantially fluid-tight seal between the rotors. The ribs and grooves 26 on the rotor 2 also produce a labyrinth-type sealing effect between the periphery of the rotor and the cylindrical wall of the bore 6 in the housing. The rotor 2 is further provided with two combustion chambers 27a and 27b, one such chamber being associated with each of the wells 25a and 25b. The combustion chambers 27a, 27b may be cylindrical but are preferably of ovoid or spherical form and are connected respectively to the corresponding wells 25a, 25b by passageways 28a, 28b which enter the combustion chambers tangentially so that the flow of gas into the combustion chambers creates turbulence and thereby assures intimate and uniform mixing of the fuel and air of a charge. The combustion rotor is made hollow to provide cooling chambers 29 which embrace and thereby effectively cool the combustion chambers 27a, 27b and wells 25a, 25b, and communicate with the hollow shaft 22 and with longitudinally extending coolant passageways 30. It will be noted that the cooling chambers 29 and passages 30 are symmetrical with respect to the axis of rotation of the rotor 2 so that a cooling medium circulated through the chambers and passages is statically and dynamically balanced and hence does not disturb the balance of the rotor regardless of the cooling medium used.

The sealing rotor 3 comprises a cylindrical portion 31 and axially projecting hollow shaft 32. It is rotatably supported by bearings 33a and 33b and is provided with labyrinth-type seals 34a and 34b between the rotor and the housing. In the periphery of the rotor there are provided longitudinally extending, circumferentially spaced wells 35a and 35b adapted to allow passage of the projecting lobes 15a and 15b of the central rotor therethrough. The wells 35a, 35b in the sealing rotor 3 are of the same size and shape as the wells 25a, 25b in the combustion rotor 2. The sealing rotor 3 is likewise provided on its periphery with longitudinally extending ribs and grooves 36 adapted to mesh with ribs and grooves 16 on the central rotor 2 and produce along the surface of the bore 7 in the housing a substantially fluid-tight labyrinth-type sealing between the sealing rotor and the housing. The same effect is produced between rotors 1 and 3. The rotor 3 is hollow to provide a cooling chamber 39 which communicates with the hollow shaft 32 and with longitudinal coolant passages 40. As in the case of the other rotors, the cooling chamber and passages are symmetrical with respect to the axis of the rotor so that the weight of the cooling medium does not disturb the static or dynamic balance of the rotor.

The housing 4 is provided with an intake passage 41 and an exhaust passage 42 communicating with the interior of the bore 5 for the central rotor at opposite sides of the sealing rotor 3. There is also a transfer channel 43 which extends between the bore 6 for the combustion rotor and the bore 5 of the central rotor and is so positioned as to connect successively one of the wells 25a, 25b of the combustion rotor with the space between the central rotor and the bore 5 and between the combustion rotor 2 and the trailing slope of one of lobes 15a, 15b of the central rotor at a time shortly after such lobe has left the corresponding well of the combustion rotor (Figure 1). In the embodiment shown in Figure 1, there is also an auxiliary exhaust passage 44 provided in the housing in a position to discharge substantially any residual exhaust gases from the wells 25a, 25b and communicating combustion chambers 27a, 27b of the combustion rotor to the surrounding atmosphere.

The engine is provided with a cooling system comprising an inlet passage 45, circulating pump 46 mounted on and driven by the rotor shaft 32 and distributing passages 47 which communicate with the hollow shafts of the respective rotors and with cooling chambers 48 in the housing. Coolant flowing through the chambers 48 and through the cooling chambers and passages of the respective rotors as described above, is collected by passages 49 and discharged through a spring loaded valve 50 which maintains the coolant in the system under a predetermined pressure and thereby prevents the formation of vapor pockets which might disturb the balance of the rotors. The inlet and outlet of the cooling circuit are suitably connected to a radiator or other heat exchanger so that the fluid is cooled and then recirculated. The cooling system shown and described provides adequate cooling both for the housing and for the rotors, with maximum cooling effect provided where it is most needed to dissipate excess heat and provide adequate cooling even when the motor is operating continuously at full load.

The combustion rotor 2 and sealing rotor 3 are driven in synchronism with the central rotor 1 by a gear train comprising intermeshing gears 51, 52 and 53 keyed respectively on the rotor shafts 12, 22 and 32. The rotors are thereby maintained in synchronism so that the lobes 15a, 15b on the central rotor always mesh accurately with the wells 25a, 25b of the combustion rotor and the wells 35a, 35b of the sealing rotor and pass therethrough without friction. The aforesaid gear train is housed in a gear chamber 58 separated by a wall 59 from the space in casing 5 housing the rotors 1, 2 and 3.

The lobes 15a and 15b of the central rotor 1 and the recesses 25a and 25b of the combustion rotor 2 are of such shape and size relative to one another to effect sealing engagement between opposite sides of each lobe with opposite sides of the corresponding well as the lobe passes into and out of said well during the synchronous rotation of the rotors at the same peripheral speed. As illustrated more particularly in Figures 3 or 3A, the cross sectional shape of the recess 25a is a curve generated by points A and B (or A' and B' in Figure 3A) disposed at opposite sides of the outer peripheral portion of the lobe 15a as the rotors 1 and 2 rotate. In a similar manner, the profile of the lobe 15a is determined by the locus of the points C and D (or C' and D' in Figure 3A) on the periphery of the rotor 2, the former on the expansion, the latter on the compression side, of the well 25a. Sealing engagement between the lobe 15a and the surface of the well 25a (or 35a in Figure 3B) is thus effected along two, three or four generatrices depending on the position of the rotors. As will be seen from Figures 3, 3A and 3B, the lobe 15a substantially fills the well 25a (or 35a) when the rotors are in "dead-center" position. As will appear from the following description, this is a factor in achieving high compression and high efficiency in the engine.

Figure 3A:
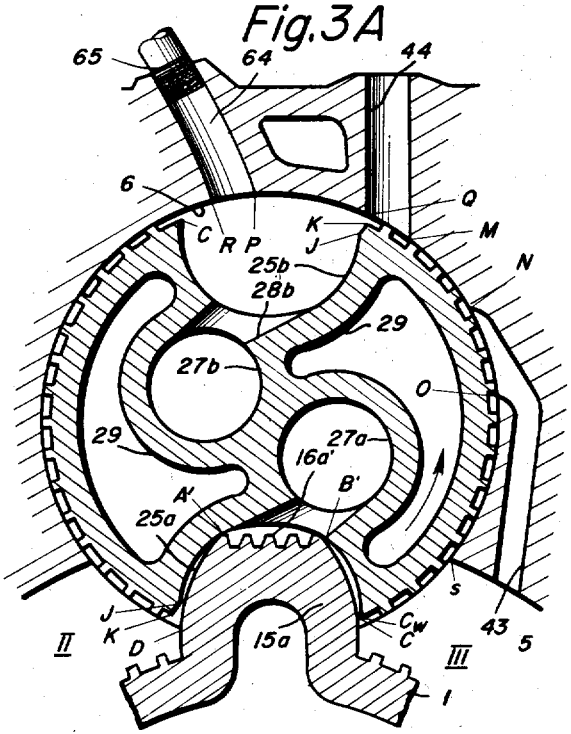
Figure 3A shows a slightly different embodiment of the piston and well portion of Figure 1, illustrated in Figure 3.
Figure 3B:
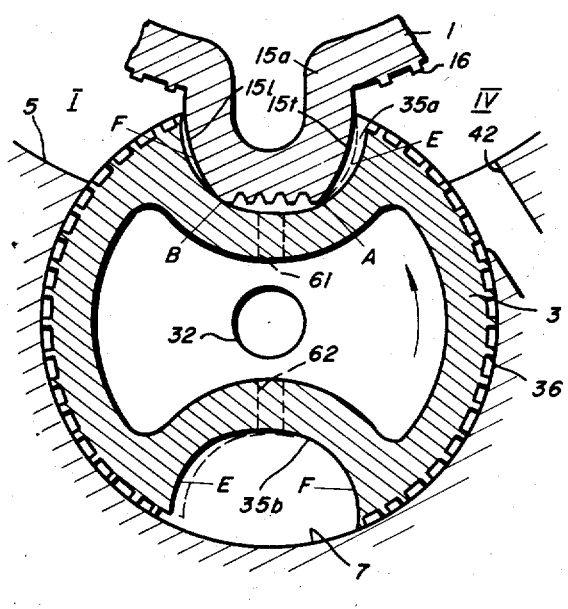
Figure 3B is an enlarged fragmentary sectional view corresponding to another portion of Figure 1 and showing a sealing rotor and adjacent portion of the central rotor in a different position.
Figure 3C:
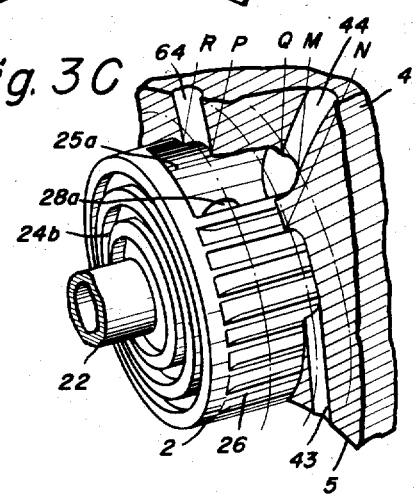
Figure 3C is a perspective fragmentary view of a portion of Figure 3 showing a different arrangement of passages therein.
Figure 3D:
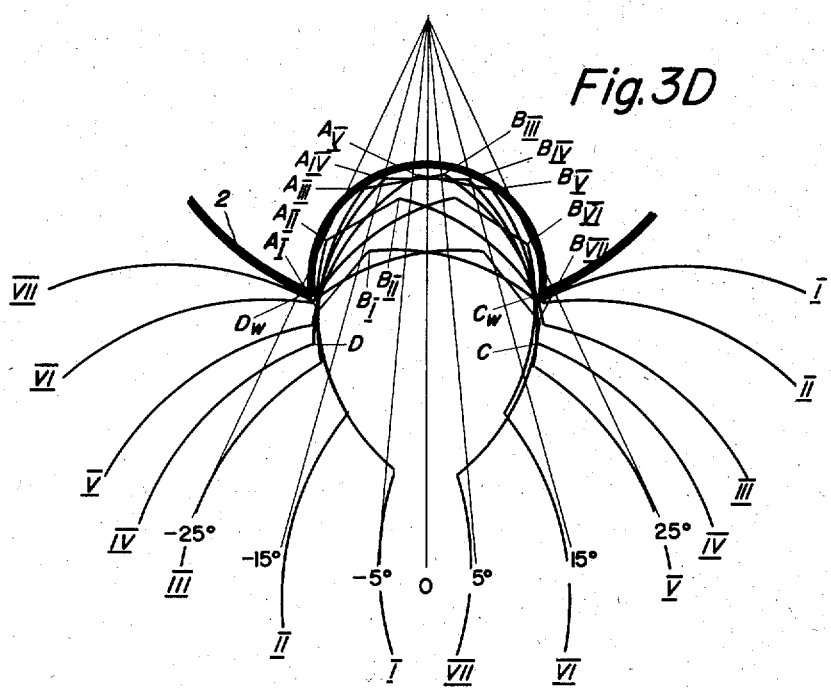
Figure 3D and 3E illustrate the geometrical construction of the profile of the pistons and piston wells in the rotary engine according to the invention.
Figure 3E:
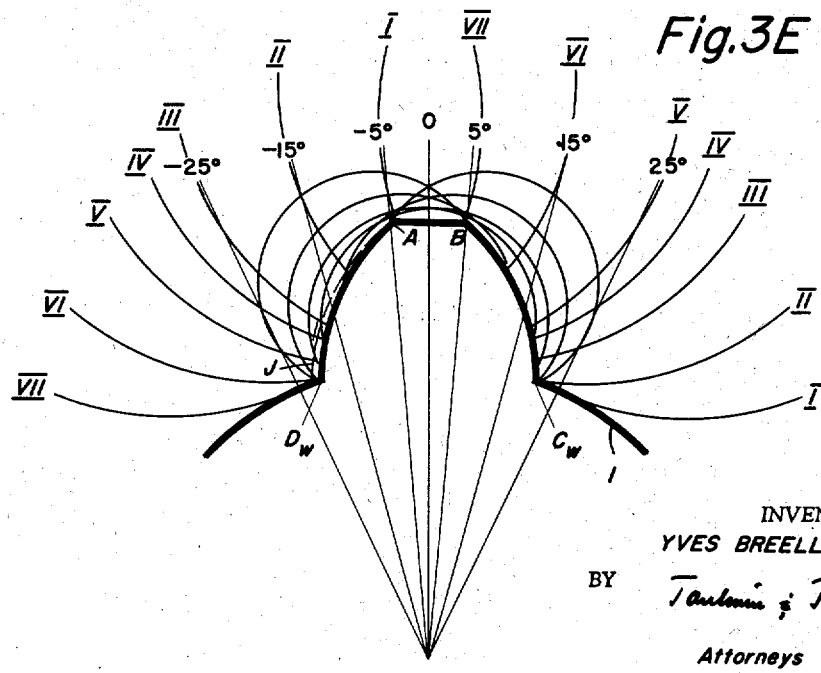

Figures 3D and 3E illustrate the manner in which the profile of the pistons and piston wells in a plane transverse to the axis of rotation of the rotors can be constructed geometrically.

The principal dimensions of the piston, its height $h$, and its width $r$ at the piston ridge, are determined at will. The profile of the side walls of the piston wells is then determined by the geometrical loci of end points A and B of ridge width $r$, of the piston. This is illustrated in Figure 3D, in which the progressive penetration of the piston into the well is shown at positions of rotation about angles of 25°, 15° and 5° prior and leading up to reaching dead center position at 0°, and 5°, 15° and 25° thereafter, clockwise rotation of the piston-bearing rotor and counter-clockwise rotation of the well-bearing rotor being assumed. These positions are numbered consecutively as I–VII, dead center position at 0° being reached when the connecting line between the center of piston-bearing central rotor 1, and the center of the well-bearing rotor 2, intersects line $A_{IV}$–$B_{IV}$ at right angles, all points being located in a plane transverse to the axes of the rotors.

Now upon clockwise rotation of rotor 1 and counter-clockwise rotation of rotor 2, the successive positions $A_I$, $A_{II}$, $A_{III}$, $A_{IV}$ and $A_V$, as indicated in Figure 3D, determine the left-hand part of the geometric locus of point A, and the positions $B_{III}$, $B_{IV}$, $B_V$, $B_{VI}$, and $B_{VII}$ determine the right-hand part of the geometrical locus of point B.

The left-hand side well profile corresponds substantially to the left-hand part locus of point A, and the right-hand side of the well profile corresponds substantially to the right-hand part locus of point B. However, a curve enveloping left-hand side of the locus of point A and right-hand side of the locus of point B, with a smoother junction of said locus sides at the upper part thereof, may be chosen, according to the embodiment shown in Figure 3, as the profile of the well, as shown by the thick line in Figure 3D.

The intersection point of the geometrical locus of A with the circumference of the gate rotor provides the corner point $D_w$ of the well profile and symmetrically the intersection of the geometrical locus of B with said circumference of said gate rotor provides the corner point $C_w$ of the well profile.

Figure 3E shows how the profile of the leading and trailing piston flank 15l and 15t respectively is arrived at.

The successive positions I to VII of the corner point $D_w$ determine a geometrical locus containing the point A and having as end point on the central rotor circumference the point D (as shown in Figures 3 and 3D). The part of this geometrical locus comprised between A and D is the sought trailing flank or slope of the piston according to the embodiment shown in Figure 3. Symmetrically the successive positions I to VII of the corner point $C_w$, determine a geometrical locus containing the point B and having as end point on the central rotor circumference, the C (as shown in Figures 3 and 3D). The port of this geometrical locus comprised between B and C is the sought leading slope of the piston according to the embodiment shown in Figure 3.

In the embodiment of the piston and well arrangement in Figure 3, the above construction method has been employed, and the piston ridge is provided with ribs and grooves 16a of approximately square cross section, constituting the sealing means between the wall of the bore housing the central rotor and the pistons, there being a very slight clearance maintained between both and sealing being effected by the labyrinth-effect described hereinbefore.

In the embodiment of the piston and well arrangement shown in Figure 3A, the well edge represented by corner point $D_w$ in Figure 3 is cut away and replaced by a beveled surface between the edge represented, is the transverse plane in which Figure 3A extends, by the points J and K. The determination of point K is not critical; the selection of point J, however, determines the new profile of the trailing slope of the piston illustrated by a dashed line in Figure 3E.

Obviously, since the cross sectional area of the well in Figure 3E is unchanged, while the new cross-sectional area of the piston is enlarged on the trailing slope of the latter, the piston devised according to the embodiment of Figure 3A fills the well more completely than that shown in Figure 3, thus permitting to attain a higher compression rate in the well and makes easier the engagement and disengagement with the corresponding wells, thus preventing that a slight play between the synchronizing gears, resulting for example from the attrition, may be detrimental to a good operation of the engine.

In Figure 3A the cross sections of the ribs and grooves 16a' on the piston ridge are of sawtooth shape instead of the rectangular shape shown in Figure 3, but any other suitable shape may be chosen.

The volume of the combustion chambers 27a, 27b is selected according to the compression ratio it is desired to obtain.

In Figure 3B, the sealing rotor 3 is further shown to possess two orifices 61 and 62 connecting the wells 35a and 35b with the internal cooling space 39 of this rotor. It is thus possible that the sealing rotors such as rotor 3 be cooled with a gaseous coolant under pressure, the pressure of which coolant is slightly above that of the waste gases escaping through on the exhaust side. Gaseous coolant under pressure escaping through the orifices 61 and 62 scavenges the part of the well space between wall portion E thereof and the trailing slope of the lobe passing therethrough as well as the adjoining exhaust zone of the central chamber 5, thereby effectively preventing any possible recycling of waste gases from the exhaust to the intake side of chamber 5.

As a further improvement, the profile of the wells 35a and 35b is deepened on the side facing the trailing slope 15t of the pistons passing therethrough. This is of advantage because the waste gases compressed in the well are released from space E behind the piston toward the exhaust compartment IV, and passage of a part of these gases toward the intake compartment I during the exit of the piston from the well is avoided.

The dashed line indicates the well profile obtained by the geometrical construction method described hereinbefore with the aid of Figure 3D, while the solid lines show the preferred embodiment of the well profile.

Figure 3A also shows an arrangement of transfer channel 43 and exhaust passage 44 different from that shown in Figure 3. By this arrangement, shown also in Figures 10 and 11, the orifices of channel 43, of diameter N—O in the plane of Figure 3A, i.e., transverse to the rotor axes, and passage 44, of diameter M—Q in the same plane, are located at such distance from each other that the distance M—N is shorter than the width C—K of the wells 25a and 25b of combustion rotor 22. Thereby it is possible to establish free communication, toward the end of each expansion cycle, between channel 43, well 25a and combustion chamber 27a (or 25b and 27b, as the case may be) on the one hand, and the free atmosphere into which passage 44 opens on the other hand, whereby the pressure of the residual expanded gases is reduced to atmospheric pressure a short time prior to their being expelled by the next following piston through the exhaust port 42. The position of the orifice of the transfer channel in the power expansion zone III, is determined in such a manner that the trailing slope of the lobe 15a be positioned at the neighbourhood of said orifice and between said orifice and the exhaust port 42 when the communication between the corresponding well 25a and the orifice of the transfer channel in the bore housing the combustion rotor commences. Communication with the outside atmosphere via passage 44 should, of cours, not be established before the expansion of the burnt gases in the engine is sufficiently complete. However, this arrangement is not always advantageous, and should not be used in cases where supercharging under excess pressure resulting from a turbo-compressor connected to the main exhaust port 42 is employed.

Yet a further conduit 64 is provided in the casing 4 which opens in the wall of chamber 6 with a diameter P—R taken in the plane of Figure 3. A fan (not shown) or other means for introducing fresh gaseous fluid, for instance air, through this conduit 64 into the chamber 6 may be connected to a socket 65 about the opening of conduit 64 to the outside. Distance Q—P in Figure 3A is smaller than the width $C_w$—K of the well in rotor 3, so that whenever one of the wells 25a or 25b and its combustion chamber 27a, 27b establishes communication simultaneously with conduit 64 and passage 44, both the well and the combustion chamber connected thereto can be scavenged by a blow of air through conduit 64 expelling substantially residual waste gases through passage 44.

At the same time, this assists in cooling the walls of the well and combustion chamber, which were shortly before exposed to the heat from the preceding combustion therein.

The location of the orifices and general direction given to conduit 64 and passage 44 can be chosen so that the optimal scavenging effect is achieved. Thus, as is shown in Figure 3C, the aforesaid orifices can be disposed in different planes transverse to the axis of rotor 2, the diameter Q—M of the orifice of passage 44 may be located in a transverse plane through Q and M, the diameter P—R of conduit 64 may be located in another transverse plane, determined by P and R, and the orifice of transfer channel 43 may be located with its diameter N—O in yet another transverse plane determined by points N and O.

In this instance, the above-mentioned distances N—M and P—Q are to be taken as the distances of the points N, M, P and Q on the same transverse plane relative to the axis of rotor 3.

In any case the location of the orifices of conduits 64 and 44 in the bore 6 must be chosen in such a manner that no communication be established between said conduits and the compression zone II through one of the wells 25a or 25b of the combustion rotor. This condition is realized when the distance between said orifices of conduits 64 and 44 in the bore 6 and the left-hand intersection point of bores 5 and 6 (in zone II) taken in a plane transverse to the axes of the rotors (Figure 3A) is greater than the peripheral width $C_wK$ of wells 25a and 25b taken in the same plane.

Fig. 4A shows a slight modification of the sealing system between the end faces of the rotors and the corresponding wall of the rotor chambers, in this instance, the interspace between the annular labyrinth sealing ribs and grooves 24b of rotor 2 and the adjacent wall of chamber 6 in casing 4 is in communication with the outside atmosphere via a passage 65.

Sealing means 24a are conventional and have been described, for instance, in the patent to London 1,316,964. The sealing means 24b are also conventional and have been described, for instance, in the patent to Schulz 835,836.

Engines in accordance with the invention can operate either with spark ignition or compression ignition (or auto-ignition). If spark ignition is employed either for starting or continuous operation, each of the combustion chambers 27a, 27b is provided with a spark plug 55a, 55b which is mounted in and carried by the combustion rotor. As illustrated in Figure 4, the spark plugs are screwed into suitable threaded openings provided in the ends of the respective combustion chambers and are disposed with identical angular directions relative to the axis of the rotor. Current is supplied to the spark plugs by a gap-type distributor having a stationary electrode 56 connected by conductor 57 to a suitable source of ignition current and positioned so as to be electrically connected by air-gap successively to the outer terminals of the spark plugs as the rotor 2 rotates to bring the plugs over against the electrode 56. Current is thus supplied to the spark plugs in timed relation to the rotation of the rotor, the timing being selected so as to "fire" the spark plugs at the proper instant. As a matter of fact any actual engagement between the stationary electrode 56 and the central electrodes of the spark plugs is unnecessary, as a spark will jump across a gap.

OPERATION

The operation of the engine illustrated in Figures 1 to 4, as a carburetor-type engine, is as follows: The central rotor 1 is turned in a clockwise direction, for instance, by means of a small starting motor (not shown) turning the power shaft 12b (or 12a) outside the casing 4, via a conventional gear and pinion drive (not shown). The peripheral rotors 2 and 3 will then turn counter-clockwise. With the rotors in the position shown in Figure 1, rotation of the central rotor in a clockwise direction causes a fuel-air mixture supplied from a carburetor (not shown) to the intake passage 41 to be drawn into the space 1 between the lobe 15a and the sealing rotor 3. It will be seen that as the lobe 15a moves away from the sealing rotor, this intake space 1 becomes larger so as to draw in the fuel-air mixture. The space II between the lobe 15a and the combustion rotor 2 already contains a fuel-air mixture which was previously inducted in like manner. The mixture in this compression space II is progressively compressed as the lobe 15a approaches the combustion rotor 2. At a stage approximately 25 degrees beyond that shown in Figure 1, the well 25a in the combustion rotor comes into communication with the compression space II and the partially compressed fuel-air mixture thereupon flows into the well and through the passage 28a into the combustion chamber 27a. Compression of the mixture continues as the rotors continue to turn, maximum compression being reached when the lobe 15a is fully in the well 25a as illustrated in Figure 3. At this moment, or preferably some time before the fuel-air mixture is ignited, for example by means of the spark plug 55a. The resulting expansion of the ignited gas, following the front of the progressing flame down the passage 28a into well 25a, has the effect of violently repelling the lobe 15a from the well 25a.

While the active forces of the expanding gases from well 25a propel the piston 15a in clockwise direction about shaft 12a, 12b as indicated by arrows $F_1$, impinging on the trailing slope of the piston tangentially to the central rotor 1, the jet forces indicated by arrows $F_2$ impinge in substantially opposite direction to said active forces $F_1$ on the rearward wall of the combustion chamber 27a and are transmitted via shaft 22 and gear 52 to gear 51 and also to shaft 12a, 12b of rotor 1, thereby adding to the propulsion of the latter in clockwise direction.

The provision of a passageway (28a or 28b) oriented tangentially to the well (25a or 25b) and connecting an eccentrically disposed reaction chamber (27a or 27b) with that well in such a manner that the longitudinal axis of the passageway extends askew to the combustion rotor axis in a plane vertical to the latter, permits to orient the gas expanding in the form of a jet from the combustion chamber through that passageway in a direction inverse to that to the rotation of the combustion rotor, so that the active forces of the expanding burnt gases are applied against a piston of the central rotor, while simultaneously jet forces in a substantially opposite direction to the aforesaid active forces act against the rear wall of the combustion chamber, and are transmitted via the axis of the combustion rotor to the axis of the central rotor, thereby permitting to derive power via the central rotor axis jointly from the aforesaid active as well as the reactive jet forces.

The expansion and resulting propulsive forces continue as the lobe of the central rotor moves away from the combustion rotor. Thus expansion occurs in the zone III (Figure 1) between the combustion rotor and the retreating lobe (here shown as lobe 15b) of the central rotor. At the stage illustrated in Figure 1, the well 25b of the combustion rotor is shown in communication with the transfer passage 43. Any gas under pressure remaining in the well 25b and associated combustion chamber 27b is thereby conducted to the expansion zone III so as to assist in propelling the central rotor 1 in a clockwise direction. The expansion continues until the lobe of the central rotor passes the exhaust passage 42 whereupon the gas is exhausted. The following lobe of the central rotor expels substantially all of the exhaust gas. As illustrated in Figure 1, gas in zone IV which had previously acted on lobe 15a is being expelled by the following lobe 15b. It will be seen that the rotor 3 provides a seal between zones I and IV and thus between the intake 41 and exhaust 42. The wells 35a and 35b of rotor 3 receive lobes 15a or 15b of the central rotor while continuing to provide a seal.

Instead of using electrical ignition, an engine in accordance with the invention can be operated by compression ignition. In this event, air—rather than a fuel-air mixture—is drawn in through intake 41 into zone I and is compressed in the zone II. The compressed air is forced into the recess 25a and combustion chamber 27a of the combustion rotor as described above. Just prior to the dead-center position illustrated in Figure 3, fuel is injected to the combustion chamber. This is effected by means of an injection nozzle 60 (Figure 1) which is located in such position as to inject fuel through the well 25a and passage 28a directly into the combustion chamber 27a just prior to the stage at which the trailing edge of the recess 25a passes the injection nozzle. The compression at dead-center position is sufficiently high to heat the charge to the ignition point, whereupon the fuel-air mixture is ignited and propels the central rotor 1 in the same manner as described above. It will be understood that the turbulence resulting from the tangential entry of the connecting passage 28a into the combustion chamber assists in obtaining effective fuel-air mixture.

It will be understood that fuel injection can also be used in conjunction with electrical ignition, the operation of the engine being otherwise as described above.

In Figure 5 there is shown another embodiment of a rotary internal combustion engine in accordance with the invention comprising a central rotor 1 having four evenly spaced lobes 15a, 15b, 15c and 15d. Around the central rotor, there are disposed four peripheral rotors comprising two combustion rotors 2a and 2b alternating with two sealing rotors 3a and 3b. Each of the combustion rotors has two wells 25a and 25b, each of which communicates with a corresponding combustion chamber. Each of the sealing rotors 3a, 3b has two wells 35a and 35b adapted to receive the lobes on the central rotor. The diameter of the cylindrical portion of the central rotor 1 is twice the diameter of the peripheral rotors so that each of the peripheral rotors turns two revolutions for each revolution of the central rotor. The housing of the engine is provided with two intake passages 41 and two exhaust passages 42. The construction and operation of the engine is otherwise the same as heretofore described except that there is a power impulse each 90 degrees of the central rotor.

In the embodiment of Figure 6, the central rotor 1 has six equally spaced lobes 15a–15f and six peripheral rotors comprising three combustion rotors 2a, 2b and 2c alternating with three sealing rotors 3a, 3b and 3c. Each of the peripheral rotors has two diametrically opposite wells and the diameter of the peripheral rotors is one-third that of the central rotor so that as the rotors turn at the same peripheral speed, the lobes of the central rotor mesh with the recesses of the peripheral rotors. The housing is provided with three intake passages 41 and three exhaust passages 42. The construction and operation of the engine is otherwise the same as previously described.

To provide still more effective sealing between the intake passage 41 and the exhaust passage 42, the intake passage may be circumferentially spaced from the sealing rotor as illustrated in Figure 7. The spacing should preferably be at least of such a circumferential width that each well is closed by the wall of the bore 7 in the housing before corresponding lobe of the central rotor uncovers the intake passage 41. This prevents any portion of the fresh charge from being carried around by the wells 35a, 35b from the intake zone I to the exhaust zone IV. Moreover, it will be seen that with the arrangement of Figure 7, the expansion stroke is greater than the compression stroke so that there is a substantial increase in output.

Figure 8:
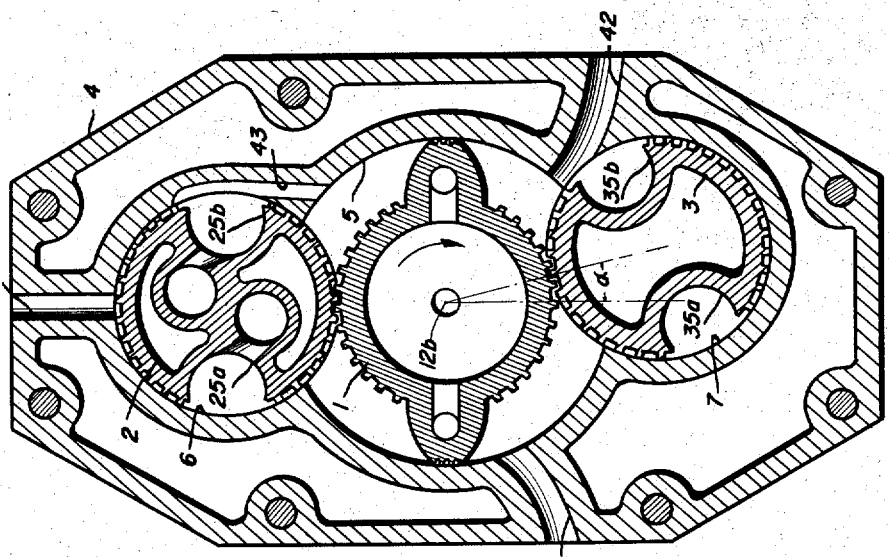

Instead of having the peripheral rotors uniformly spaced about the central rotor, the spacing may be non-uniform in order to vary the relative lengths of the compression and expansion strokes. For example, as illustrated in Figure 8, the angular distance from the compression rotor to the sealing rotor is greater than the angular distance from the sealing rotor to the combustion rotor in a clockwise direction, the difference corresponding to the angle α. This has the effect of decreasing the length of the expansion stroke with respect to the compression stroke. If the intake passage 41 were located adjacent the sealing cylinder 3 as in Figure 1, the expansion stroke would be shorter than the compression stroke. Since, however, the intake passage may be circumferentially spaced from the sealing rotor as in Figure 7, it is possible to approximately equalize the compression stroke and expansion stroke. The relation between the lengths of the compression stroke and expansion stroke can thus be varied according to the operating conditions and desired operating characteristics of the engine.

Figure 9:
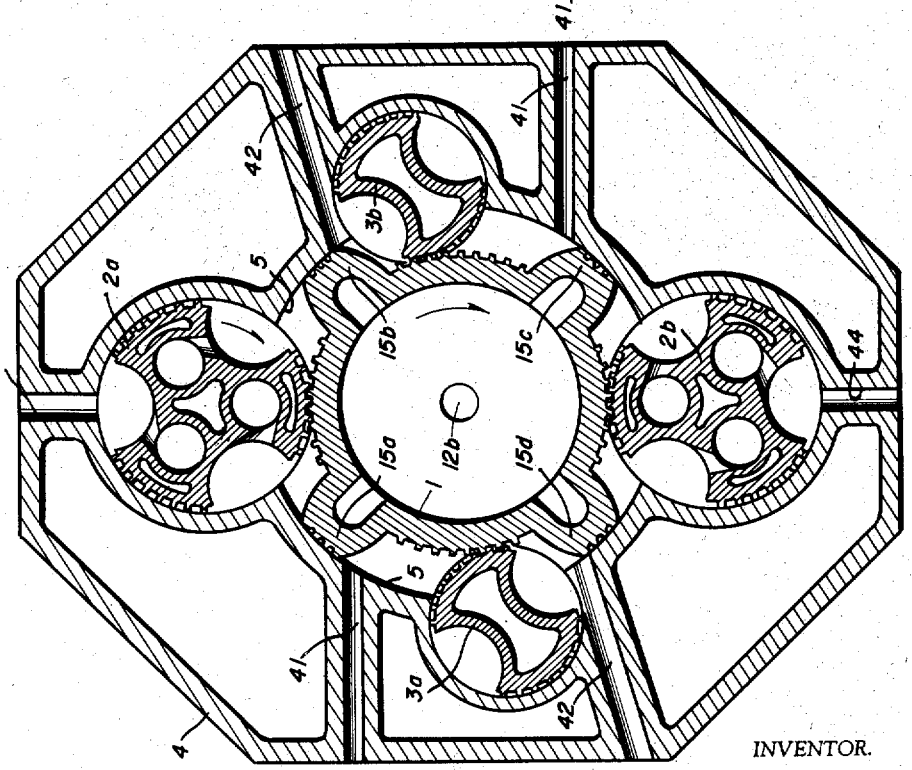
Figure 9 is a cross section similar to Figure 1 and showing another embodiment.

In Figure 9, there is shown a rotary engine in accordance with the invention having a central rotor 1 with four lobes and four peripheral rotors comprising two combustion rotors 2a and 2b alternating with two sealing rotors 3a and 3b. Each of the combustion rotors has a diameter three-quarters that of the central rotor and has three peripheral wells, each with an associated combustion chamber. Each of the sealing rotors 3a, 3b has a diameter which is half that of the central rotor and has two peripheral wells. The proportions of the engine are such that each of the wells of the combustion rotor is successively in communication with the expansion zone between the combustion rotor and the corresponding lobe on the central rotor throughout substantially the entire expansion period. In other words, the well of the combustion rotor remains in communication with the bore 5 of the central rotor substantially until the corresponding lobe on the central rotor reaches the exhaust passage 42. This eliminates the need of transfer passages like passage 43 in Figure 1 and improves the efficiency of the engine since the slight throttling effect of the transfer passage is avoided. It also simplifies the construction of the engine. Except as otherwise indicated, the construction and operation of the engine shown in Figure 9 is the same as previously described.

Figure 10:
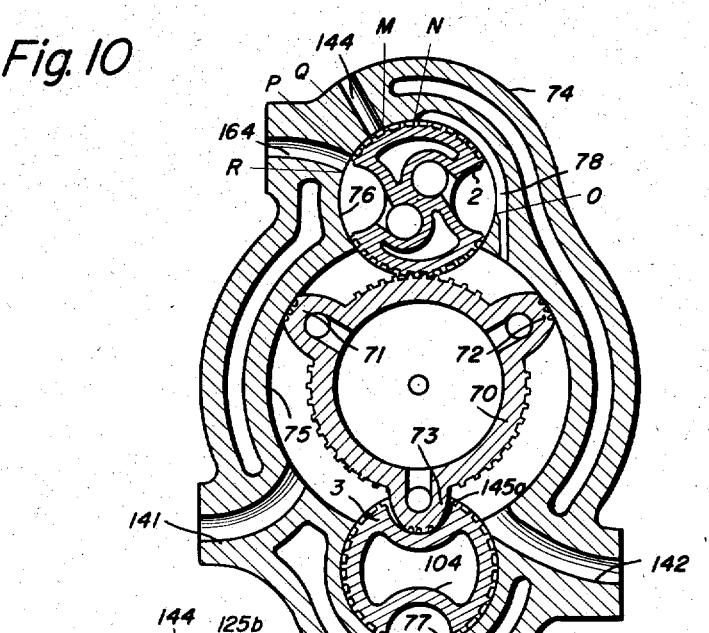
Figure 10 illustrates, in transverse sectional view, a further embodiment of a rotary engine according to the invention wherein the central rotor bears three pistons and cooperates with two peripheral rotors.

As an example of a rotary engine according to the invention, in which the central rotor has an uneven number of pistons, Figure 10 illustrates such an engine. While the combustion rotor 2 and the sealing rotor 3 are identical with those described in connection with the preceding figures, the central rotor 70 is different in that it is provided with three pistons 71, 72 and 73.

The engine casing 74 is provided with parallel cylindrical bores 75, 76 and 77 similar to bores 5, 6 and 7 in casing 4 of Figure 1.

The large peripheral opening of transfer channel 78 into bore 76 contributes to a more complete utilization of the expansion of the burnt gases.

Passage 144 corresponds to passage 44 and conduit 164 to conduit 64 in Figure 3, and their functions are the same as explained in connection therewith.

Figure 11:
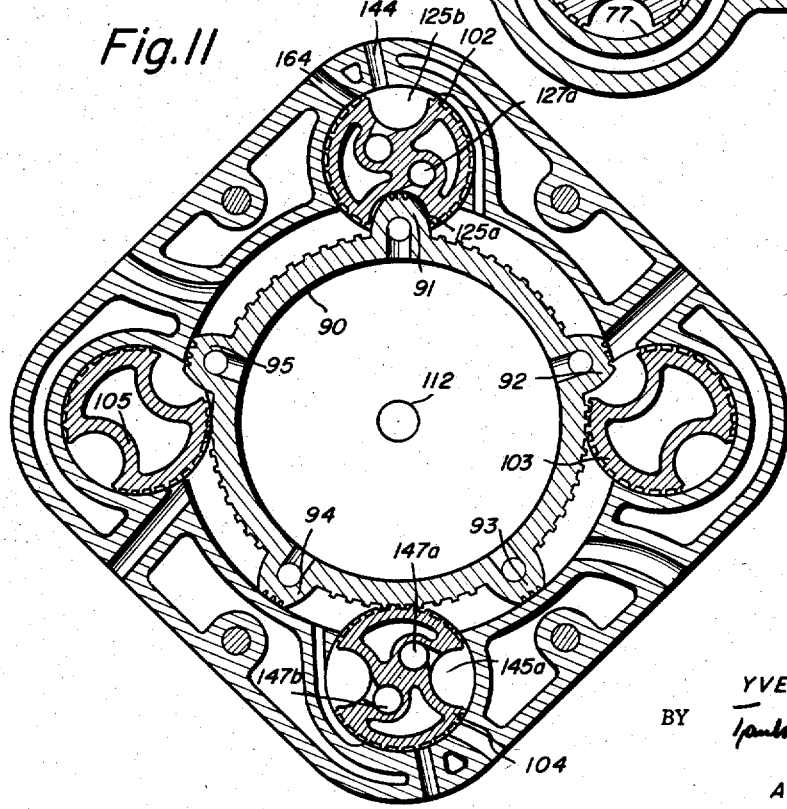
Figure 11 illustrates, in transverse sectional view, yet another embodiment of the rotary engine according to the invention in which the central rotor bears five pistons and cooperates with four peripheral rotors.

The rotary engine according to the invention illustrated in Figure 11 is similar to that shown in Figure 4; however, the central rotor 90 in Figure 4 is provided with five pistons 91, 92, 93, 94 and 95 as against the four pistons of the central rotor in Figure 4.

The fact that, in the embodiments shown in Figures 10 and 11, the central rotor has one more piston than there are peripheral rotors used in the engine, affects the operation thereof as follows:

When, for instance, piston 91 in Figure 11 penetrates completely into the well 125a of rotor 102, i.e., at dead-center position being shown in Figure 11, piston 93 has reached a position intermediate sealing rotor 103 and combustion rotor 104. It will, therefore, only penetrate into well 145a of the latter rotor after a further clockwise rotation of central rotor 90 by 36°.

At that time, however, piston 95 will be intermediate sealing rotor 105 and combustion rotor 102 and will not penetrate into well 125b of the latter to reach dead center therein until after a further clockwise rotation of the central rotor 90 about 36°. Consequently, the time interval elapsing between the explosion in combustion chamber 127a and the next following explosion in combustion chamber 147a will be the same as that between successive explosions in combustion chambers 127b and 147b, which occur at half-time intervals between the former explosions. The transmission of power from the engine via its power shaft 112 is thus more regular and smoother than in the embodiments of Figures 1 and 4 and Figures 5–9.

In the embodiment shown in Figure 10, a similar smooth and regular operation is achieved as in the embodiment of Figure 11.

It will also be noted in Figure 10, that when the central rotor 70 is rotated by 60° so that piston 73 passes intake port 141, the sealing rotor 104 is caused to rotate about 90°, thereby effectively preventing any undesirable communication between the well 145a and the intake zone.

As a further feature of the rotary engines according to the invention, the conduits 64 (Figure 3) or 164 (Figures 10 and 11) can be used for introducing a supercharge of an explosive mixture, for instance of air and fuel, or of fresh "comburant" (combustion-sustaining agent, such as air) into the wells and combustion chambers of the combustion rotor.

In the first case, if the supercharge consists of an explosive mixture, the distance P—Q of the conduits 64 (164) from the passage 44 (144) (or the projection thereof into a plane transverse of the axes of the rotors), should be at least as wide as to avoid any substantial losses of explosive mixture through passage 44 or 144.

In the latter case, if the supercharge consists of comburant, this precaution is not necessary and part of the comburant can be used for scavenging the wells of the combustion rotor. The introduction of a supercharge of comburant permits the use of a higher rate of fuel and correspondingly increases the power output of the engine.

The rate of fuel may be increased either by introducing a mixture richer in fuel through the intake port, or by injecting a larger quantity of fuel into the combustion chamber, or by a combination of both measures.

As the construction in accordance with the invention eliminates all reciprocating parts and as the rotating parts are all statically and dynamically balanced, the engine is capable of operating at high speeds without vibration. The compression obtained can be predetermined by the length of the compression stroke, the magnitude of lobes, and by the volume of the combustion chamber. The shape of the combustion chambers and the tangential disposition of the passageways leading to them assures effective mixing and uniform burning of the charge. By reason of the effective labyrinth-type sealing means provided, it is possible to obtain high compression and any losses through leakage during the expansion step are minimized.

Labyrinth-type sealing means are well known in the art of steam turbines and are described, for instance, in U.S. Patents 835,836, 898,257, 1,316,964 and 1,498,892, some of which have been mentioned before. Other patents describing the same are the German patent to Engermann, No. 189,239 and German Patents 369,463, 396,598 and 398,088.

It was, however, not conceived in the art to provide labyrinth-type sealing means of the rib-and-groove type on rotary elements, which sealing means extend in the direction of the rotary axis of the element. Obviously, it was believed that the losses due to the great longitudinal extension of the ribs in proportion to their height and width in any type of axial arrangement would become so great as to make the use of such arrangement impracticable in steam turbines and like machines involving gaseous fluids.

I have discovered that, in the case of rotary engines of the internal combustion type, and at the speeds of the rotors inherent in the operation of such engines of from 1000 to 8000 and preferably between 4000 and 8000 r.p.m., the arrangement of sealing ribs and grooves extending longitudinally in the direction of the rotor axis creates a perfectly satisfactory sealing effect even with ribs of small height and width.

This important feature of my present invention will be illustrated in the following:

*Example*

A rotary engine comprising a central rotor bearing two pistons, and two gate rotors associated with the central rotor, as illustrated in Figure 8, has the following dimensions:

| | |
|---|---|
| Diameter of each rotor body | 130 millimeters. |
| Piston height $h$ | 30 millimeters. |
| Rotors and pistons altitude | 62.5 millimeters. |
| Piston ridge width $r$ | 15 millimeters. |
| Angular difference $\alpha$ | 14°. |
| Height of sealing ribs on rotor bodies, $h_s$ | 2 millimeters. |
| Width of sealing ribs, $r_s$ | 2 millimeters. |
| Width of grooves intermediate adjacent ribs, $w_s$ | 4 to 6 millimeters. |
| Clearance between sealing means (Ribs on one rotor and grooves of other or wall of cavity), the engine being cold | 0.05 to 0.15 millimeters. |
| Clearance between sealing means but engine in operation | About 0.05 millimeters. |
| Speed of central rotor | Between 1000 and 8000 r.p.m. |

Under the above conditions, I have found that, at a speed of 4000 r.p.m. the maximum amount of loss calculated on the basis of the weight of the introduced combustible mixture, is 15%, the power loss caused thereby being in the order of 10%.

If the rotary engine is operated at a speed of 8000 r.p.m., the loss in weight of gas is reduced very effectively to at the most 8%, and a corresponding loss in power not exceeding 5%. These are, however, maximum figures, and the actual losses remain well below the same.

After the rotary engine has operated for a certain period of time, a very thin layer of solid combustion deposits such as soot and the like is formed on the inner walls of the central chamber and cavities and will contribute to further narrowing the above-mentioned clearance of about 0.05 millimeter, thereby further reducing the rate of gas and power losses in the engine.

The losses of power in the order of 5% occurring in the rotary engine according to the invention are more than compensated by the advantages derived from the new labyrinth-type sealing means.

Thus, it is possible to attain much higher speed, lubrication is reduced to a minimum and only required for the gear train and rotary bearings, for instance, ball or roller bearings, and the mechanical output of the engine is vastly improved through the elimination of mechanical friction between the rotors themselves and the rotors and the stator casing, beyond the improvement of that output inherent per se in rotary engines which do not require a transformation of a linearly reciprocating into a rotary movement.

The power output of the rotary engines according to my invention is about four times as high as that attained with an internal combustion engine of the classical reciprocating piston type of the same unit weight of the motors under the same conditions of operation.

If this same comparison is made on the basis of a unit of volume of the motor, then the power of the rotary engines according to my invention is about up to nine times greater than that of a comparable classical internal combustion engine.

These advantages are further enhanced by the simple construction of the engine, the number of pieces required for building the same being only about one-fifth of that required to construct a conventional internal combustion engine.

The fact that mechanical friction is eliminated with the exception of gear trains and bearings, multiplies the lifetime of these engines.

All of these factors result in an efficient, high-capacity rotary engine.

Rotary engines according to my invention can be used in automotive vehicles of all kinds including trucks, buses, tractors and tanks, as well as in motorcycles, scooters and the like. They are furthermore adaptable, in corresponding sizes, for the propulsion of locomotive engines, airplanes, ship's engines, stationary motors of all kinds, and are thus generally adaptable to replace internal combustion engines of the carburetor and the Diesel type.

While several embodiments of the invention have been shown by way of example in the drawings and particularly described, it will be understood that the invention is in no way limited to these embodiments but is of wide applicability within the scope of the appended claims.

What I claim is:

1. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells each of said wells having a volume and shape just sufficient to permit passage of said lobes of the central rotor therethrough, said combustion rotor having in its interior at least two combustion chambers disposed eccentrically relative to the axis of said combustion rotor, passageways in said combustion rotor each of which connects one of said eccentrically disposed combustion chambers to one of said wells in said combustion rotor in such a manner that it extends from the combustion chamber to the well in a direction substantially opposed to the sense of rotation of the combustion rotor, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors, and labyrinth-type sealing means provided on said rotors, said lobes and wells having a shape and size to effect a sealing free from mechanical friction between opposite sides of each of said lobes with opposite sides of the corresponding well as said lobe passes through said well.

2. A rotary engine according to claim 1, in which each of said combustion chambers is of approximately circular cross section and in which the connection between said combustion chamber and the corresponding one of said wells comprises a passage which enters the combustion chamber tangentially.

3. A rotary engine according to claim 1, in which means are provided for injecting fuel into each of said combustion chambers.

4. A rotary engine according to claim 1, in which a spark plug associated with a combustion chamber to ignite fuel therein is mounted on and carried by the combustion rotor.

5. A rotary engine according to claim 4 further comprising a gap-type distributor including a stationary electrode and means connecting said electrode with a source of current, and a rotating electrode rigidly associated with the combustion rotor and connected to said spark plugs mounted in said combustion rotor, and so disposed as to leave an air-gap between said rotating electrode and said stationary electrode, said stationary electrode being positioned to be electrically connected by bridging of said air-gap to said rotating electrode so as to supply current to said spark plugs in predetermined timed relationship to the rotation of said rotor.

6. A rotary engine according to claim 1, in which said casing is formed with a transfer passage through the wall of the casing enclosing the bores housing said central and said combustion rotor, said passage connecting the bore of said combustion rotor with the bore for said central rotor, the opposite ends of said transfer passage being positioned to provide communication between a well of said combustion rotor and a space between said latter rotor and the trailing slope of a lobe on said central rotor when said lobe has travelled a predetermined distance after leaving said well.

7. A rotary engine according to claim 1, in which the other of said two gate rotors is a sealing rotor, and wherein said casing is provided with intake and exhaust passages communicating with the bore for said central rotor on opposite sides of said sealing rotor.

8. A rotary engine according to claim 7 in which said intake passage way is so circumferentially spaced from said sealing rotor that each lobe of the central rotor is kept positioned between said intake passage way and said sealing rotor until any communication of the corresponding well of said sealing rotor with the admission zone of the annular space comprised between the central rotor and its housing is cut off completely, so that there is at no time any communication between said intake and exhaust passages.

9. A rotary engine according to claim 7, in which said casing is provided with a further exhaust passage opening into the bore for said combustion rotor in a position to substantially discharge residual exhaust gases from said wells in said combustion rotor.

10. A multi-cycle rotary internal combustion engine comprising a stator having fluid intake and outlet ports, a central chamber in said stator, a central rotor having a substantially cylindrical rotor body, at least two pistons disposed on said peripheral surface of said central rotor and distributed thereabout by equal angular intervals relative to the axis of said central rotor and being disposed for rotation in said central chamber, at least two cavities in said stator peripherally intersecting said central chamber, at least two gate rotors, each having at least two wells in the rotor surface peripherally disposed therein for the passage of said pistons of said central rotor, the diameter of said gate rotors being chosen in such a manner that the circumferential length between two adjacent wells of said rotors be substantially equal to the circumferential length between two adjacent lobes of said central rotor; the axes of said central rotor and said gate rotors being parallel with each other, each of said gate rotors being disposed in one of said cavities for rotation therein, one of said gate rotors being a combustion rotor having at least two combustion chambers, each of said combustion chambers being connected respectively with each of said wells in said combustion rotor, the profiles of the wells of each of said gate rotors taken in a plane which is disposed transverse to the rotor axes and rigidly associated to the gate rotor so as to rotate with the latter, being determined by the successive geometrical loci occupied by the end points, in that same plane, of the ridges of said pistons during synchronized rotation of the piston-bearing and the well-bearing rotors.

11. A rotary engine as described in claim 10, wherein the profiles of the piston leading and trailing slopes taken in a plane transverse to the rotor axes and rigidly associated to said central rotor are determined by the successive geometrical loci occupied by the corner points, in that same plane, of the wells of said gate rotors with the peripheral surfaces of the latter during synchronized rotation of the piston-bearing and the well-bearing rotors.

12. A rotary engine as described in claim 11, wherein the trailing edges of the wells of said combustion rotor are beveled and the profiles of the pistons of said central rotors are correspondingly more convexly vaulted on the trailing slopes thereof than corresponds to said geometrical loci of said corner points, so as to cause said pistons to fill said wells more completely when at dead center position therein during the passage therethrough and to make easier the engagement and disengagement with the corresponding wells, thus preventing that a slight play between the synchronizing gears, resulting for example from the attrition, may be detrimental to a good operation of the engine.

13. A rotary engine as described in claim 10, wherein the profiles of the wells of said gate rotors other than said combustion rotors taken in a plane transverse to the rotor axes, are more deeply concave than required by said geometrical loci of said end points of said piston.

14. A multi-cycle rotary internal combustion engine as described in claim 10, wherein there is provided a slight clearance between said central rotor and pistons on the one hand, and the walls of said central chamber on the other hand, and, furthermore, a slight clearance between said gate rotors and the walls of the respective cavities housing the same as well as a slight clearance between said gate rotors and said peripheral surface of said central rotor, so that all of said rotors can rotate free from mechanical friction; said rotary engine further comprising gear means for rotating said peripheral rotors and said central rotor in synchronism with each other so that each of said pistons on said central rotor successively passes through wells of successive ones of said peripheral rotors.

15. A multi-cycle rotary internal combustion engine as described in claim 10, wherein passages are provided in said combustion rotor, each of which passages connects one of said combustion chambers with one of said wells in said combustion rotor, said passage opening tangentially into said well.

16. A multi-cycle rotary internal combustion engine as described in claim 10, wherein passages are provided in said combustion rotor, each of which passages connects one of said combustion chambers with one of said wells in said combustion rotor in such a manner that the expanding burnt gases from said combustion rotor apply active forces to the central rotor against the lobes of the latter, and simultaneously apply reactive forces in opposite direction against the rear wall of said combustion chamber, thereby transmitting said reactive forces via the axis of said combustion rotor to the axis of said central rotor, thereby permitting to derive power via the latter axis jointly from said active and said reactive forces.

17. A multi-cycle rotary internal combustion engine comprising a stator having fluid intake and outlet ports, a central chamber in said stator, a central rotor having one peripheral substantially cylindrical surface, at least two pistons disposed on said peripheral surface of said central rotor, said central rotor and pistons thereon being disposed for rotation in said central chamber and leaving a slight clearance between the wall of said chamber and the ridges of said pistons, at least two cavities in said stator peripheral to said central chamber, at least two gate rotors having at least two wells in the rotor surface peripherally disposed therein for the passage of said pistons of said central rotor, the axes of said central rotor and said gate rotors being parallel with each other, each of said gate rotors being disposed in one of said cavities for rotation therein with a slight clearance from the wall of said cavity, at least one of said gate rotors being a combustion rotor having at least two combustion chambers, each of said combustion chambers being connected, respectively with each of said wells in said combustion rotor; labyrinth-type sealing means comprising grooves and ribs extending parallel to said rotor axes and provided on the ridges of said pistons, on the peripheral surface of said central rotor intermediate said pistons, and on the peripheral surface of said gate rotors; annular labyrinth-type sealing means between the end faces of all of said rotors and the corresponding wall portions of said central chamber and cavity; passageways provided in said stator for establishing free communication between said annular labyrinth-type sealing means and the outside; and a gear drive outside said central chamber and cavity for driving said rotors in synchronized rotation.

18. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of the central rotor therethrough, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors, said lobes and wells having a shape and size to effect a sealing free from mechanical friction between opposite sides of each of said lobes with opposite sides of the corresponding well as said lobe passes through said well, said casing being provided with fluid intake and exhaust passages communicating with the bore for said central rotor on opposite sides of said sealing rotor, and with a further exhaust passage opening into the bore for said combustion rotor in a position to substantially discharge residual exhaust gases from said wells in said combustion rotor, and wherein the distance between the opening of said transfer passage into said bore and the opening of said further exhaust passage thereinto, taken in a plane transverse to the rotor axes, is smaller than the peripheral width of said wells taken in the same plane.

19. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of the central rotor therethrough, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors, said lobes and wells having a shape and size to effect a sealing free from mechanical friction between opposite sides of each of said lobes with opposite sides of the corresponding well as said lobe passes through said well, said casing being provided with fluid intake and exhaust passages communicating with the bore for said central rotor on opposite sides of said sealing rotor, and with a further exhaust passage and a further intake passage for the introduction of fresh gaseous fluid therethrough, both said further passages opening into the bore for said combustion rotor, said further exhaust passage being in a position to substantially discharge residual exhaust gases from said wells in said combustion rotor, the distance between the openings of said further exhaust passage and said further intake passage into said bore, taken in a plane transverse to the axes of the rotors, being smaller than the peripheral width of said wells in said combustion rotor taken in the same plane, so as to effect a complete scavenging of the waste gases from said wells and the distance between the opening of said further intake passage and the end part of the compression zone adjacent to the combustion rotor, taken in a plane transverse to the axes of the rotors, being greater than the peripheral width of said wells in said combustion rotor taken in the same plane, so as to avoid any communication between said further intake passage and said compression zone through said wells of said combustion rotor.

20. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of said central rotor therethrough, said combustion rotor having in its interior at least two combustion chambers disposed substantially completely eccentrically relative to the axis of said combustion rotor, passageways in said combustion rotor each of which connects one of said eccentrically disposed combustion chambers to one of said wells in said combustion rotor, each of said combustion chambers and passageways constituting a combustion space which is enclosed on both sides by wall portions of said combustion rotor so that said combustion space opens exclusively through the opening of said wells in the cylindrical combustion rotor surface, combustion initiating means associated with said combustion space, a casing having intersecting parallel cylindrical bores in which said respective rotors rotate, and gear means for rotating said peripheral rotors in synchronism with the central rotor so that each of said lobes on the central rotor successively passes through wells of successive ones of said peripheral rotors.

21. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of the central rotor therethrough, said combustion rotor having in its interior at least two combustion chambers disposed substantially completely eccentrically relative to the axis of said combustion rotor and substantially in sectors of said rotor intermediate said wells, passageways in said combustion rotor each of which connects one of said eccentrically disposed combustion chambers to one of said wells in said combustion rotor, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors.

22. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about the axis of said central rotor, each of said peripheral rotors having in its cylindrical surface longitudinally extending peripheral wells to permit passage of said lobes of the central rotor therethrough, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors, a combustion rotor having in its interior at least two combustion chambers disposed substantially completely eccentrically relative to the axis of said combustion rotor, passageways in said combustion rotor each of which connects one of said eccentrically disposed combustion chambers to one of said wells in said combustion rotor in such a manner that an elongated combustion space is formed by each of said combustion chambers and the passageways connected thereto, the longitudinal axis of which combustion space, projecting into a plane vertical to the axis of the combustion rotor, is disposed askew to the latter axis.

23. In a multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of said central rotor therethrough, the improvement of a combustion rotor having in its interior at least two combustion chambers disposed substantially completely eccentrically relative to the axis of said combustion rotor, passageways in said combustion rotor, each of which connects one of said eccentrically disposed combustion chambers to one of said wells in said combustion rotor in such a manner that the center of gravity of each combustion chamber is situated substantially outside the central plane of the corresponding well passing through the combustion rotor axis, each of said combustion chambers and passageways constituting a combustion space which is enclosed on both sides by wall portions of said combustion rotor so that said combustion space opens exclusively through the opening of said wells in the cylindrical combustion rotor surface, combustion initiating means associated with said combustion space, a casing having intersecting parallel cylindrical bores in which said respective rotors rotate, and gear means for rotating said peripheral rotors in synchronism with the central rotor so that each of said lobes on the central rotor successively passes through wells of successive ones of said peripheral rotors.

24. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of the central rotor therethrough, said combustion rotor having in its interior at least two combustion chambers disposed substantially completely eccentrically relative to the axis of said combustion rotor and substantially in sectors of said rotor intermediate said wells, passageways in said combustion rotor each of which connects one of said eccentrically disposed combustion chambers to one of said wells in said combustion rotor in such a manner that the combustion chamber is disposed forward of the well in the direction of rotation of the combustion rotor, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors.

25. In a multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of the central rotor therethrough, a casing having intersecting parallel cylindrical bores in which said respective rotors rotate, gear means for rotating said peripheral rotors in synchronism with the central rotor so that each of said lobes on the central rotor successively passes through wells of successive ones of said peripheral rotors, the improvement of combustion rotor having in its interior at least two combustion chambers disposed substantially completely eccentrically relative to the axis of said combustion rotor, passageways in said combustion rotor each of which connects one of said eccentrically disposed combustion chambers to one of said wells in said combustion rotor in such a manner that an elongated combustion space is formed by each of said combustion chambers and the passageways connected thereto, the longitudinal axis of which combustion space, projected into a plane vertical to the axis of the combustion rotor, is disposed askew to the latter axis.

26. A multi-cycle rotary internal combustion engine comprising a central cylindrical rotor having a plurality of identical longitudinally extending lobes spaced uniformly about the circumference of said rotor and a plurality of peripheral rotors comprising alternately at least one sealing and at least one combustion rotor, which rotors are disposed around said central rotor for cooperation therewith and rotatable about axes parallel to the axis of said central rotor, each of said peripheral rotors having in its cylindrical surface longitudinally extending peripheral wells to permit passage of said lobes of said central rotor therethrough said combustion rotor having in its interior at least two combustion chambers disposed substantially completely eccentrically relative to the axis of said combustion rotor, passageways in said combustion rotor each of which connects one of said eccentrically disposed combustion chambers to one of said wells in said combustion rotor in such a manner that said passageway extends from the combustion chamber to the well in a direction substantially opposed to the sense of rotation of the combustion rotor, each of said combustion chambers and passageways constituting a combustion space which is enclosed on both sides by wall portions of said combustion rotor so that said combustion space opens exclusively through the opening of said wells in the cylindrical combustion rotor surface, combustion initiating means associated with said combustion space, a casing having intersecting parallel cylindrical bores in which said respective rotors rotate, and gear means for rotating said peripheral rotors in synchronism with the central rotor so that each of said lobes on the central rotor successively passes through wells of successive ones of said peripheral rotors.

References Cited in the file of this patent

UNITED STATES PATENTS

| | | |
|---|---|---|
| Re 22,818 | Berry | Dec. 17, 1946 |
| 902,225 | Friend | Oct. 27, 1908 |
| 1,856,839 | Macart | May 3, 1932 |
| 2,018,391 | Whitfield | Oct. 22, 1935 |
| 2,070,631 | Sunderland | Feb. 16, 1937 |
| 2,088,121 | Swink | July 27, 1937 |
| 2,275,205 | Straub | Mar. 3, 1942 |
| 2,690,164 | Skok | Sept. 28, 1954 |
| 2,742,882 | Porter | Apr. 24, 1956 |

FOREIGN PATENTS

| | | |
|---|---|---|
| 159,060 | Great Britain | Feb. 24, 1921 |
| 397,352 | Great Britain | Aug. 24, 1933 |